3,736,285
AQUEOUS COATING COMPOSITION CONTAINING PARTIALLY REHYDRATED METAKAOLIN PIGMENT AND NEUTRAL LATEX
Barry S. Miller, Roselle, N.J., assignor to Engelhard Minerals & Chemicals Corporation, Woodbridge Township, N.J.
No Drawing. Continuation-in-part of application Ser. No. 723,602, Apr. 23, 1968. This application Nov. 12, 1970, Ser. No. 89,082
Int. Cl. C08f 45/24
U.S. Cl. 260—29.6 R      1 Claim

ABSTRACT OF THE DISCLOSURE

Ammonia is employed to impart a basic pH and to disperse an aqueous suspension of a normally acidic, adsorptive dye-sensitive pigment during the preparation of an aqueous coating composition containing the pigment. Sheets coated with the ammonia-treated coating composition are used as receiving sheets for printing with transfer sheets containing encapsulated color-reactant dye material.

RELATED APPLICATION

This application is a continuation-in-part of my copending application Ser. No. 723,602, filed Apr. 23, 1968, now abandoned.

BACKGROUND OF THE INVENTION

Certain finely divided adsorptive white or light-colored solids contain active sites of sufficient strength to convert colorless color-forming dye material such as a mixture of crystal violet lactone and benzoyl leucomethylene blue to colored form when the finely divided adsorptive solid particles and an oily solution of the dyes come into adsorptive contact. It is understood that an electron donor-acceptor reaction between the adsorptive solid and the dye material is involved. This type of reaction is utilized in a type of carbonless pressure-sensitive printing described in U.S. 2,730,456 to Green et al. Receiving sheets for such printing paper contain a coating that is pigmented with the adsorptive reactive particulate solid. A suitable adhesive is used to bind the pigment particles to a substrate, usually paper.

The reactive adsorptive particulate solid presently used commercially to provide the sensitive, coated receiving sheets is attapulgite clay. This is a naturally-occurring material containing a predominating quantity of the magnesium aluminosilicate mineral attapulgite. Although aqueous suspensions of attapulgite clay are normally mildly basic, the mineral surfaces of the clay are heterogeneous and contain the strong sites, including acidic sites, required for the dye development. The acidic sites are detectable by standard pKa tests. Attapulgite-coated print receiving sheets are prepared by dispersing attapulgite clay with tetrasodium pyrophosphate or sodium silicate, mixing the clay dispersion with a binder, usually a mixed starch-latex binder, and coating the resulting composition on paper.

Certain adsorptive solids which are every sensitive to the dyes used in the pressure-sensitive record material form acidic pigment-water suspensions. Some of these pigments are exceptionally sensitive to the dyes used in the transfer sheets. Further, these pigments are whiter than attapulgite and provide whiter, brighter receiving sheets. The hydrothermally treated calcined kaolin clay pigments described in U.S. 3,223,546 to Hemstock are examples. When the dispersants and adhesives employed in the preparation of attapulgite coating compositions are used with the hydrothermally treated calcined kaolin clay pigments, the resulting receiving sheets leave much to be desired. Frequently the images tend to fade. After 48 hours the contrast between the printed mark and the background may be substantially less than it was 30 seconds after the image had been formed. Further, coating compositions of the desired high solids content are not obtained when the conventional dispersants are employed with some hydrothermally processed pigments.

THE INVENTION

An object of this invention is to provide a method for improving the sensitivity characteristics of receiving sheets containing normally acidic adsorptive pigments which react with an oily solution of colorless chromogenic compounds to form colored marks.

Another object is to provide novel coating compositions containing such pigments and to provide a method for preparing such compositions.

Briefly stated, in accordance with the present invention ammonia is added to an aqueous suspension of a normally acidic, adsorptive pigment having acid sites in amount sufficient to impart a basic pH before an aqueous coating composition containing the pigment is applied to paper, dried and calendered. The pH adjustment may be carried out before other ingredients are mixed with an aqueous suspension of the pigment or it may be carried out in situ in presence of an acidic or neutral suspension containing the normally acidic pigment and other ingredients. In both cases, the ammonia acts as a pigment dispersant, improving rheology and sheet sensitivity.

Preferably, the pigment is initially dispersed in water containing the ammonia. In this case, the use of ammonia also provides a means for preparing higher solids coatings.

When aqueous ammonia is used to increase the pH of a normally acidic pigment, in accordance with this invention, the coated receiving sheets are more sensitive to certain chromogenic dyes than they would be in the absence of ammonia. The sheets are more sensitive than they would be if other bases such as sodium hydroxide were used to increase pH. Fading of the printed image, which frequently occurs, is avoided. To the contary, the images generally tend to be more intense after 48 hours than they were 30 seconds after printing. With some acidic pigments which provide nonfading images in the absence of ammonia additive, the use of ammonia during the preparation of the coating composition results in images that increase sharply in intensity with aging. Frequently the images are more intense initially and after aging than they would be if ammonia were not added during the preparation of the coating color.

Because the sensitivity of pigments to certain chromogenic reactive compounds is generally attributed to acid sites on the pigment surface, it was contrary to expectations to discover that ammonia would improve the sensitivity properties of the coated receiving sheets. For example, alkaline sodium silicate solutions are invariably used to disperse attapulgite clay in the preparation of sensitive receiving sheets. These solutions, however, have a very detrimental effect on the sensitivity of receiving sheets pigmented with acidic adsorptive solids such as rehydrated calcined kaolin clay. It would have been expected that aqueous ammonia, also a base and a pigment dispersant, would have a similar effect.

Moreover, aqueous ammonia is ineffective as a dispersant for attapulgite clay. The desirable effects of aqueous ammonia with pigments such as rehydrated calcined clay could not be predicted from the effects of ammonia on attapulgite coating colors.

DESCRIPTION OF THE INVENTION

Coating color compositions of the present invention contain the following as essential ingredients: water, pigment, adhesive binder and ammonia.

The ammonia may be incorporated into and uniformly mixed with the coating composition (color) at any point during its preparation to obtain the improvements in coating color rheology and sensitivity of the coated sheet.

The amount of ammonia employed is calculated to provide a finished aqueous coating color having a pH within the range of 8.0 to 9.5, preferably 8.5 to 9.5. When the pH is below 8.5, the improvement in sheet sensitivity may not be so appreciable as when more ammonia is employed and the pH is higher. On the other hand, pH values above 9.5 may be excessive for practical purposes.

The finely divided adsorptive solids to which the present invention is applicable have pH values within the range of 3 to 6. (The pH values refer to those obtained by slurrying the pigment in distilled water at 20 percent weight solids and testing the pH of the slurry at 25° C.) Another characteristic of adsorptive solids within the scope of the invention is that they have acid sites of sufficient strength to change a colorless form of crystal violet lactone to blue form. More specifically, the adsorptive sites have a pKa value less than 0.8, as determined by the method described by O. Johnson, "Acidity and Polymerization Activity of Solid Acid Catalysts," Journal of Physical Chemistry, 59, 827 (1955). It should be noted, however, that solids having a pH value within the range of 3 to 6 do not necessarily possess the desired acid sites. For example, a 20 perecnt solids slurry of naturally-occurring dispersant-free Georgia kaolin clay usually has a pH of about 4 to 5. The pKa value, however, is above 3 and the clay is lacking in the desired sensitivity.

Suitable solids have adsorptive properties and have B.E.T. surface areas in excess of 25 m.$^2$/g., usually above 50 m.$^2$/g.

The reactive adsorbent solid should contain particles predominantly finer than 20 microns, preferably finer than 5 microns, in order to provide the desired pigmented coating.

Hydrated and anhydrous silica-alumina solids of varying silica-to-alumina ratios are within the scope of this invention.

The preferred adsorptive solids are hydrated aluminum silicates obtained by heating an aqueous slip of metakaolin (a form of calcined anhydrous kaolin clay) under superatmospheric pressure until the product has a water of crystallization within the range of about 4 percent to 13 percent by weight. Since high purity kaolin clays contain about 14 percent water of hydration when fully hydrated, these hydrated aluminum silicates are referred to as "partially rehydrated metakaolins." (The terms "metakaolin" and "water of crystallization" are defined in U.S. 3,224,892 to Hemstock.) The metakaolin employed in the preparation of partially rehydrated metakaolin pigments may be obtained from kaolinite, halloysite, anauxite, nacrite or mixtures thereof. Saturated steam pressures of about 400 to 1000 p.s.i.g. may be used in producing the partially rehydrated metakaolin pigments although higher or somewhat lower pressures may be employed. Details of the treatment are described in U.S. 3,224,892.

Partially rehydrated metakaolin pigments containing more than about 9 percent water of crystallization tend to produce fading images in the absence of ammonia treatment. See U.S. 3,223,456 to Hemstock. By incorporating ammonia into coating compositions containing such pigments, fading is minimized or avoided. The partially rehydrated metakaolin is therefore eminently satisfactory as the sole sensitive pigment when ammonia is employed. Partilaly rehydrated metakaolin pigments containing not more than about 9 percent water of crystallization, as disclosed in Ser. No. 710,662, filed Mar. 5, 1968 by Swanson, now abandoned produced images that do not fade even in the absence of ammonia. By using ammonia to disperse these pigments in water, the printed images generally intensify substantially with aging.

When preparing partially rehydrated metakaolin pigments for use in pressure-sensitive printing, the metakaolin reactant should be free from conventional polymeric inorganic clay dispersants (i.e., sodium silicate, sodium condensed phosphates). Other ingredients such as certain polyvalent metal salts may be present with the metakaolin during the hydrothermal treatment.

Also within the scope of this invention are anhydrous aluminum silicate pigments obtained by calcining partially rehydrated metakaolin pigments at temperatures ranging from 300° C. to 1200° C., preferably 900° C. to 1100° C. See U.S. 3,226,252 to Hemstock. Calcination has a desirable effect on pigment viscosity. Also, calcined rehydrated metakaolin pigments, especially those calcined at temperatures within the range of 900° C. to 1100° C., tend to produce nonfading images. By using ammonia with these calcined pigments, initial and aged sheet sensitivity is improved.

The partially rehydrated metakaolin pigments have surface areas (B.E.T.) within the range of about 50 m.$^2$/ to 300 m.$^2$/g. In some cases, products with higher surface areas are obtained. Partially rehydrated metakaolin pigments containing less than about 11 percent water of crystallization generally tend to have lower surface areas than products that contain more water of crystallization. All surface area values mentioned herein refer to values obtained by a nitrogen absorption method described by S. Brunauer, P. H. Emmett and E. Teller in an article entitled "Adsorption of Gases in Multi-Molecular Layers," page 309 of Journal of the American Chemical Society, vol. 60, February 1938, using the molecular size data of H. K. Livingston presented in his article entitled "Cross-Sectional Areas of Molecules Adsorbed on Solid Surfaces," page 569, Journal of the American Chemical Society, vol. 66, April 1944.

Also suitable are acid treated or acid leached clays of various types, e.g., acid leached kaolins and montmorillonite clays. An example is the Japanese acid clays which have strong acid sites and are highly adsorptive. Japanese acid clays are understood to be hydrogen ion-exchanged montmorillonites. Representatives samples of Japanese acid clays have B.E.T. surface areas close to 300 m.$^2$/g. and pH values of 3.2 to 3.6.

Still other dye-reactive alumina-silica pigments are the dimethyl sulfoxide-expanded kaolin described in a copending application of Norman H. Horton, Ser. No. 608,967, filed Jan. 13, 1967, now U.S. 3,520,719, and the ion-exchanged zeolitic molecular sieves of a copending application of Walter L. Haden, Jr. et al., Ser. 464,871, filed June 17, 1965, now U.S. 3,434,864.

The adhesives used in carrying out the invention are those used in the paper coating field to bind conventional paper coating pigments, such as kaolin clay, to the paper. The preferred binders are neutral synthetic latexes such as the acrylic resin latexes used by the paper coating industry. Acrylic resins are polymers or copolymers of acrylic and methacrylic acid derivatives, especially the methyl and ethyl esters of these acids. An example of a suitable acrylic copolymer is an emulsion polymerized, neutral styrene-acrylic copolymer having a glass transition temperature of −12° C. Various acrylic resin emulsions are identified by chemical structure or trade name in U.S. 3,410,711 to Hoge.

Other suitable latexes include styrene-butadiene and polyvinyl acetate. Starch binders may be employed alone or in combination with compatible latex. Casein has a very detrimental effect on sensitivity and is preferably not used when the sheets are employed for printing with the chromogenic dyes. Binder is usually used in amount within the range of 5 percent to 20 percent of the pigment weight (on a dry binder and pigment weight basis).

In carrying out the invention, the ammonia is employed with the acidic reactive pigments in coating colors containing 20 percent to 55 percent solids. The lower solids colors, e.g., colors containing up to about 35 percent solids, may be obtained by adding ammonia as an aqueous solution at any point during the preparation of the coating color. Coating colors containing such solids generally may not require the addition of secondary dispersants. Coating colors containing up to about 45 percent solids may be obtained by dispersing the acidic pigment in an aqueous solution of ammonia and adding the binder ingredients to the predispersed clay. To obtain coating colors containing more than about 45 percent solids, the pigment should be dispersed in an aqueous solution containing ammonia and an organic polymeric polyelectrolyte dispersant, especially an anionic dispersant such as a salt of a naphthalene sulfonate-formaldehyde condensate. The pigment dispersion is then mixed with adhesive dispersion or suspension. The use of synthetic polymeric polyelectrolyte in the preparation of coating compositions containing partially recalcined metakaolin pigments is disclosed and claimed in my copending application Ser. No. 728,893, filed May 14, 1968, now U.S. 3,582,378. The above-mentioned solids levels are illustrative only and vary from pigment to pigment. Calcination of partially rehydrated metakaolin products has a beneficial effect on coating color solids.

Sodium silicate and tetrasodium pyrophosphate are preferably absent. As mentioned above, these are the dispersants that are conventionally used to prepare attapulgite coated receiving sheets. When used in amount sufficient to have a dispersant effect on pigments such as partially rehydrated metakaolin, sodium silicate and tetrasodium pyrophosphate tend to have a very adverse effect on the sensitivity of the coated receiving sheets. Moreover, tetrasodium pyrophosphate, which is an extremely effective dispersant for attapulgite, is a very poor dispersant for pigments such as partially rehydrated metakaolin. Generally speaking, a sodium condensed phosphate or sodium silicate dispersant may be present in amount within the range of 0 percent to less than 0.4 percent of the pigment weight (calculated on a water-free dispersant basis). Sodium silicate may be present in amount within the range of 0 percent to less than 0.3 percent of the pigment weight (water-free sodium silicate basis).

The coating colors may be used to provide 1 to 10 lb./3000 ft.$^2$ coat weights on paper. Normally 3 to 8 lb. coat weights, especially 4 to 6 lb. weights, are employed. As mentioned above, ammonia has outstanding properties as a dispersant for partially rehydrated metakaolin pigments containing 4 percent to 13 percent water of crystallization. Therefore, ammonia is also used to advantage to disperse such pigments when preparing aqueous coating compositions for paper products that are printed with conventional printing inks.

EXAMPLE I

This example illustrates the desirable effect of using ammonia to impart a basic pH to a normally acidic coating color containing a high surface area, partially rehydrated metakaolin pigment.

The pigment was prepared by forming a 20 percent solids aqueous slip of a commercial, dispersant-free calcined metakaolin pigment ("Satintone #2"), heating 3½ gallons of the slip in a 5-gallon autoclave until a pressure of 500 p.s.i.g. was obtained and maintaining the pressure at 500 p.s.i.g. for five hours. The contents of the autoclave were cooled, oven dried at about 250° F. and pulverized in a mill with a 0.02" screen. The product had a pH of 5, a water of crystallization of 12.09 percent and a B.E.T. surface area of 147 m.$^2$/g.

A control coating color containing about 30 percent solids was prepared by agitating a sample of the pigment in distilled water at about 28 percent solids and mixing the pigment dispersion with "UCAR® Latex 40," a substantially neutral, emulsion polymerized styrene-acrylic copolymer latex containing 46 percent solids. The pigment dispersion and aqueous latex were mixed in proportions to provide a coating color containing 100 parts by weight pigment to 9 parts by weight latex solids. No dispersants were present. After the ingredients had been mixed, the aqueous coating composition was screened through a 100 mesh (Tyler) vibrating screen. The pH of the control coating color was 5.0.

To test the effect of incorporating ammonia into the coating color, a 10 percent aqueous solution of ammonia was incorporated with mixing into a portion of the control coating color. Sufficient ammonia solution was used to increase pH to 9.0.

Sheets of paper raw stock were separately coated with the control coating color and with the ammonia-treated coating color. In both cases, sufficient coating was used to produce a coat weight of 5 lb./3000 square feet. Coating was in the machine direction on the felt side. The sheets were calendered and air dried immediately after being coated. The dried sheets were cut into strips on a 6" x 10" die and placed in a photoprint dryer at about 200° F. with the coated side out for 3 minutes.

The dried sheets were immediately transferred to individual sealed polyethylene bags which were stored in a closed drawer in the room maintained at a substantially constant temperature of 73° F. and 50 percent R.H.

Quantitative evaluations of the sensitivity of the pigment-coated receiving sheets towards a mixture of crystal violet lactone and benzoyl leucomethylene blue were made as follows. A commercial sheet of printing paper uniformly coated with a microencapsulated solution of crystal violet lactone and benzoyl leucomethylene blue in chlorinated diphenyl oils was placed in face-to-face relationship with the coating on the pigment-coated receiving sheet. While the two sheets were in contact, they were passed through a calender under pressure sufficient to rupture the capsules on the transfer sheet, liberate the solution of dyes and form a printed image on the pigment-containing receiving sheet.

Sensitivity was determined by contrasting the printed and unprinted areas of the calendered sheets. The sensitivity testing involved separately determining the reflectances of the printed area and the reflectance of the background with a Bausch and Lomb Opacimeter with a green filter (572 m$\mu$ peak). A "calender intensity" value was then calculated in accordance with the following equation:

Percent calender intensity $$= \frac{\text{average reflectance of printed area} \times 100}{\text{average reflectance of background}}$$

A low calender intensity value therefore indicates a high contrast ratio of printed to background and represents a sharp printed image. A high calender intensity value represents a low contrast ratio.

Calender intensity values were determined 30 seconds after calendering and 48 hours after testing. Since sharpness of print varies inversely with calender intensity value, an increase in the value after the sheet had aged for 48 hours indicates fading of the printed image. Conversely, a 48 hour value that is less than the 30 second value indicates a printed image that has become more intense with age.

Results of the sensitivity tests are reported in Table I.

TABLE I

Effect of ammonia on sensitivity of receiving sheets coated with partially rehydrated metakaolin pigment

| Coating color composition | Sensitivity of printed sheet—calender intensity value, percent after— | |
|---|---|---|
| | 30 seconds | 48 hours |
| No ammonia present (pH 5.0) | 39 | 48 |
| Ammonia added to pH 9.0 | 38 | 38 |

The data in Table I on the results of testing sensitivity of print receiving sheets containing a high surface area partially rehydrated metakaolin pigment show that in the absence of ammonia in the coating color, the image faded. The data show that fading was prevented by using ammonia in preparing the coating color. Thus, without ammonia, the calender intensity ratio value increased from 39 after 30 seconds to 48 after 48 hours.

A comparison of these data show also that the ammonia did not impair the initial sheet sensitivity. In fact, the 30 second sensitivity value obtained with ammonia was slightly better than the 30 second sensitivity value without ammonia.

EXAMPLE II

This example illustrates the benefits of the present invention in the preparation of coating colors from certain highly acidic metallic salt-treated sensitive pigments.

The partially rehydrated metakaolin pigments were obtained in substantially the same manner as the partially rehydrated metakaolin pigment of Example I. However, before rehydration, certain salts of strong acids and relatively weak bases had been added to the water in which the metakaolin was rehydrated. The salts used were titanium trichloride and nickel acetate, each in amount of 5 percent of the weight of the metakaolin. Rehydration was at 500 p.s.i.g. for 7 hours.

The procedure of Example I was followed in detail to determine the effect of adding ammonia to coating colors containing each of the metallic salt-treated pigment. As in Example I, the binder was "UCAR Latex 40" employed in amount of 9.0 parts by weight latex solids to 100.0 parts by weight pigment solids. Results are summarized in Table II.

TABLE II

Effect of adding ammonia to metal salt-treated partially rehydrated metakaolin pigmented coating colors

| Pigment (metal salt present) | Ammonia treatment | Coating color pH of coating color | Sheet sensitivity—calender intensity value percent, after— | |
|---|---|---|---|---|
| | | | 30 seconds | 48 hours |
| 5% titanium trichloride | None | 4.4 | 35 | 41 |
| Do | Present | 9.0 | 32 | 29 |
| 5% nickel acetate | None | 4.2 | 41 | 52 |
| Do | Present | 9.0 | 35 | 34 |

Data in Table II for the results of testing sensitivity of receiving sheets with and without amonia show that with both pigments the sheets were more sensitive after 30 seconds and 48 hours than sheets which were prepared with coating compositions that did not contain ammonia. The data show also that in the absence of ammonia during coating color preparation, the sheets tended to fade (i.e., the 48 hour calender intensity values were higher than 30 hour values). When ammonia was present in the coating colors, in accordance with this invention, the printed image on the receiving sheets increased in intensity instead of fading. Thus, when ammonia was present, the 48 hour calender intensity values were lower than the 30 second intensity values.

EXAMPLE III

This example illustrates the desirable effect of using ammonia with an acid-leached kaolin clay as the sensitive pigment.

The pigment was obtained by heating a mixture of 1.0 part by weight metakaolin, 1.2 parts by weight 95 percent $H_2SO_4$ and 13.2 parts by weight water at 180° F. for 4 hours, cooling, filtering and washing the filter cake until the washing was sulfate-free (as determined by testing with barium chloride solution). The filter cake was dried and then pulverized in a high speed hammer mill with a 0.02″ screen. The $Al_2O_3$ analysis of the product was 19 percent (on a volatile-free weight basis) with the balance substantially $SiO_2$.

The procedure of Example I was followed in preparing control and ammonia-treated coating colors. These colors were coated on paper and tested for sensitivity as in Example I.

The data for the results of testing the sensitivity of the coated receiving sheets which appear in Table III show that the image on the receiving sheet prepared without ammonia faded after 30 seconds. By using ammonia in the coating color, the 30 second sensitivity was improved and the image intensified substantially with age.

TABLE III

Effect of adding ammonia to coating color containing acid-leached kaolin clay as sensitive pigment

| Coating color | | Sheet sensitivity—calender intensity value, percent, after— | |
|---|---|---|---|
| Ammonia treatment | pH of coating color | 30 seconds | 48 hours |
| None | 3.0 | 51 | 57 |
| Present | 8.7 | 49 | 43 |

EXAMPLE IV

This example illustrates several advantages of using ammonia as a dispersant for high solids coating colors containing an acidic sensitive pigment. The example also points out advantages of using ammonia instead of conventional inorganic polymeric dispersants, i.e., sodium silicate and tetrasodium pyrophosphate.

A sensitive, partially rehydrated metakaolin pigment was prepared by heating a 20 percent solids slip of metakaolin in water to 500 p.s.i.g. for 3 hours. The acidic pigment had a surface area of 102 m.$^2$/g. and contained 7.14 percent water of crystallization. At this water of crystallization level, rehydrated metakaolin pigments generaly do not fade as do partially rehydrated metakaolin pigments containing more water of crystallization.

Tests were carried out to determine the maximum solids content of coating colors that could be obtained with this pigment when it was employed with various dispersants. Similar tests were carried out without using any dispersant.

The basic coating color formulation was as follows: pigment 100.0 parts by weight; "UCAR Latex 40" (46 percent solids), 15.0 parts by weight; and water to prepare the formulation to maximum percent solids. In all cases, the paper was provided with a 5 lb./ream coat weight.

In a test carried out without any dispersant, the pigment was mixed with water and the suspension was mixed with the 46 percent solids neutral acrylic latex, using 15.0 parts latex solids to 100.0 parts pigment. The maximum solids coating color obtained without a dispersant was 36 percent.

In a test carried out with ammonia as the sole dispersant, the pigment was dispersed in an aqueous solution of ammonia (pH 9), and the dispersion was mixed with the 46 percent solids latex, again using 15.0 parts latex to 100.0 parts pigment. In this case a 45 percent solids coating color was prepared. When an anionic organic dispersant ("Lomar D") was added to the water after ammonia was added and before incorporating pigment, a 50 percent solids coating color having acceptable rheology was obtained. The dispersant was a sodium salt of a naphthalene sulfonate-formaldehyde condensate and was employed in amount of 0.8 percent of the pigment weight.

Using Hercules rheograms to study the rheology of coating colors prepared with various proportions of tetrasodium pyrophosphate and sodium silicate dispersants, optimum dispersant dosage at maximum solids was determined. Minimum viscosity at maximum shear rates was used as the criterion for determining optimum dispersant dosage for the partially rehydrated metakaolin pigment. With tetrasodium pyrophosphate the maximum solids was 41 percent. At this solids level, minimum viscosity was obtained with 0.4 percent tetrasodium pyrophosphate based on the dry pigment weight. Maximum solids was 43 percent in tests carried out with "N" brand sodium silicate (the registered trademark of a solution containing 8.90 percent by weight $Na_2O$, 28.7 percent $SiO_2$ and the balance substantially water). The optimum proportion of dispersant in this case was 0.3 percent by weight sodium silicate water-free basis), based on the dry pigment weight.

Coating colors containing maximum solids and optimum amount of dispersant (ammonia alone, a combination of ammonia and organic dispersant, sodium silicate and tetrasodium pyrophosphate) were applied separately to paper (5 lb. coat weight). All coated sheets were dried, calendered and tested for sensitivity, as described in Example I. For purposes of comparison, the 36 percent solids coating color without a dispersant was applied to paper and tested for sensitivity in the same manner. Results are summarized in Table IV.

TABLE IV

Effect of dispersant species on sensitivity of receiving sheets coated at high solids with partially rehydrated metakaolin pigment

| Dispersant | Dispersant, percent based on pigment wt. | Maximum percent solids of coating color | Sheet sensitivity—calender intensity value, percent, after— | |
|---|---|---|---|---|
| | | | 30 seconds | 48 hours |
| None | | 36 | 41 | 37 |
| Ammonia to pH 9 | | 45 | 39 | 36 |
| Tetrasodium pyrophosphate | 0.4 | 41 | 48 | 47 |
| Sodium silicate | 0.3 | 43 | 50 | 49 |
| Ammonia/"Lomar D" mixture to pH 9 | 0.8 | 50 | 41 | 36 |

Data in Table IV on the solids level of coating colors indicate that ammonia was a better dispersant for the partially dehydrated metakaolin pigment than either sodium silicate or tetrasodium pyrophosphate. Thus, a 45 percent solids color was obtained with ammonia as the sole dispersant while the maximum solids using tetrasodium pyrophosphate and sodium silicate were 41 percent and 43 percent, respectively. Without a dispersant, a 36 percent solids coating composition was obtainable with this particular partially rehydrated metakaolin pigment.

Data on the sensitivity of sheets produced with ammonia show that ammonia improved 30 second and 48 hour sensitivity, as compared to the sheet coated without any dispersant. In contrast, tetrasodium pyrophosphate and sodium silicate each had a very detrimental effect on both 30 second and 48 hour sensitivities.

The data in Table IV for the coating compositions containing ammonia and an organic polymeric polyelectrolyte dispersant ("Lomar D") show that the coating color was at much higher solids (50 percent) than could be prepared with either sodium silicate or tetrasodium pyrophosphate as the dispersant. Further, the sheets obtained with the ammonia and the polymeric organic dispersant compared favorably in 30 second and 48 hour sensitivities to the sheet coated at lower solids without any dispersant. In contrast, the sheets prepared with sodium silicate and tetrasodium pyrophosphate had poorer 30 second and 48 hour sensitivity values than the control sheets.

I claim:

1. A coating composition for applying to paper to provide an improved sensitive coating composition thereon which consists essentially of water, partially rehydrated metakaolin pigment containing 4 percent to 13 percent water of crystallization, having a pH within the range of 3 to 6 when slurried in distilled water at 20 percent solids and tested at 25° C. and having a surface area within the range of 50 m.$^2$/g. to 300 m.$^2$/g. as determined by the nitrogen absorption method of Brunauer, Emmett and Teller, a paper coating adhesive which is a substantially neutral latex of a resinous polymer of at least one ethylenically unsaturated monomer, said latex being present in amount within the range of 5 percent to 20 percent, based on the weight of said pigment, and, as the sole inorganic pigment dispersant, ammonia present in amount such that the coating composition has a pH within the range of 8.0 to 9.5, said coating composition having a solids content within the range of 20 percent to 55 percent by weight and a pH within the range of 3 to 6 in the absence of said ammonia, the composition being free from casein, sodium silicate and sodium condensed phosphate.

References Cited

UNITED STATES PATENTS

| 2,699,432 | 1/1955 | Marra et al. | 260—29.6 R |
| 2,710,244 | 6/1955 | Bertorreli | 106—72 |
| 3,130,063 | 4/1964 | Millman et al. | 106—288 B |
| 3,226,252 | 12/1965 | Hemstock | 260—41 B |
| 3,409,568 | 11/1968 | Hollyday et al. | 260—29.6 R |
| 3,211,565 | 10/1965 | Bundy | 260—29.6 R |
| 3,223,546 | 12/1965 | Hemstock | 106—288 B |
| 3,224,892 | 12/1965 | Hemstock | 106—288 B |
| 3,309,211 | 3/1967 | Weiss et al | 106—72 |
| 3,215,663 | 11/1965 | Weisberg | 260—29.6 MN |
| 3,223,669 | 12/1965 | Chase et al. | 260—29.6 MN |

HAROLD D. ANDERSON, Primary Examiner

U.S. Cl. X.R.

106—72, 288 B; 117—3.1, 36.1; 260—17.4 R, 29.6 H, 29.6 MD, 29.7 R